United States Patent [19]

Yamamoto et al.

[11] Patent Number: 4,651,039
[45] Date of Patent: Mar. 17, 1987

[54] MOLDED-TYPE UNDERWATER MOTOR

[75] Inventors: Sakuei Yamamoto; Mitsuhiro Nishida, both of Fukuoka, Japan

[73] Assignee: Mitsubishi Denki Kabushiki Kaisha, Japan

[21] Appl. No.: 824,410

[22] Filed: Jan. 31, 1986

[30] Foreign Application Priority Data

Feb. 8, 1985 [JP] Japan .............................. 60-17483[U]
Feb. 8, 1985 [JP] Japan ................... 60-23736

[51] Int. Cl.⁴ ............................................. H02K 5/10
[52] U.S. Cl. ........................................ 310/87; 29/596;
264/272.19; 310/45
[58] Field of Search ....................... 310/43, 45, 87, 42;
29/596, 732; 264/272.19, 272.2, 137

[56] References Cited

U.S. PATENT DOCUMENTS 3,436,569 1/1969 Flaherty, Jr. et al. ................. 310/43
3,530,417 9/1970 Link ................................ 264/272.19
3,688,137 8/1972 Filhol ..................................... 310/43
4,427,740 1/1984 Stackhouse et al. .................. 310/45
4,496,866 1/1985 Yamamoto et al. ................... 310/87

FOREIGN PATENT DOCUMENTS 2503574 8/1976 Fed. Rep. of Germany ........ 310/43

Primary Examiner—Patrick R. Salce
Assistant Examiner—D. L. Rebsch
Attorney, Agent, or Firm—Sughrue, Mion, Zinn, Macpeak, and Seas

[57] ABSTRACT

A molded-type underwater motor is equipped with a stator core impregnated with varnish, powder coatings provided on the perimeters of coil ends projecting from the sides of the stator core, and a resin molded body covering both the powder coated coil ends and the stator core. A resin of the same family is used to prepare the resin molded body, the powder coatings and the varnish.

6 Claims, 7 Drawing Figures

MOLDED-TYPE UNDERWATER MOTOR

BACKGROUND OF THE INVENTION

This invention relates to improvements in molded type underwater motors for use in, for instance, wells.

FIG. 1 is a sectional view of the principal portion of a molded type underwater motor of the sort disclosed by Published Japanese Patent appl. No. 58-51755. The molded type underwater motor shown therein comprises a stator 1 consisting of a stator core 2 and a stator coil; a can 3 of thin stainless steel inserted into the inner periphery of the stator core 2; a resin molded member 4 of unsaturated polyester resin enveloping the outer periphery and side of the stator core 2 and the perimeter of the coil end 5 of the stator coil; a screw receptacle 7; a rotor 8; a rotor shaft 9; a bracket 10 rotatably supporting the rotor shaft 9 through a bearing 11; a fastening bolt 12; and a powder coated layer 13 of polyethylene or polypropylene built up on the perimeter of the coil end 5, the whole body being molded within the resin body 4 after the powder coated layer is formed.

The operation of this molded type underwater motor will subsequently be described. Unsaturated polyester resin is employed as the resin molded body 4 to encapsulate the perimeter of the coil end 5 at low pressures and low temeratures. The powder coated layer 13 of polyethylene or polyproplene is provided between the resin body 4 and the coil end 5. If water infiltrates through the mold member 4, it will be kept out of the coil by the layer 13.

Moreover, an encapsulating liquid A injected about the perimeter of the rotor 8 and the can 3 is used to prevent water from infiltrating into the stator core 2.

With the molded type underwater motor thus constructed, it is difficult to arrange the can on the inner periphery of the stator core so as to prevent water from infiltrating through the inner periphery of the stator core. Since the can is made of stainless steel, it is also uneconomical.

SUMMARY OF THE INVENTION

The present invention is intended to solve this problem and it is therefore an object of the present invention to provide a highly economical molded type underwater motor without using a stainless steel can.

The molded type underwater motor according to the present invention is provided with a stator core impregnated with varnish, powder coated coil end perimeters, and a resin molded body covering both the powder coated coil ends and the stator core.

In the molded type underwater motor according to the present invention, the resin body makes the motor water-impenetrable and the powder coatings make the coil ends doubly water proof, whereas the varnish with which the stator core is impregnated allows it to be unaffected by water.

BRIEF DESCRIPTION OF THE DRAWINGS

Like reference characters designate like or corresponding parts.

DETAILED DESCRIPTION OF THE PREFERRED EMBODIMENTS

Referring to the accompanying drawings, an embodiment of the present invention will now be described.

Figure 2:
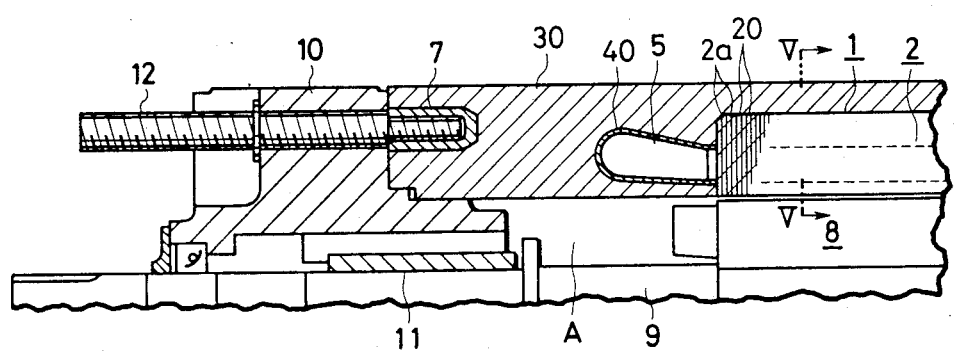
FIG. 2 is a sectional view of a molded type underwater motor embodying the present invention.

In FIG. 2, there is shown an epoxy resin varnish 20 sandwiched in between the core pieces 2a of the stator core 2 by vacuum impregnation, an epoxy resin molded body 30 employed to cover the outer periphery and sides of the stator core 2 and the perimeter of the coil ends 5 of the stator coil, and an epoxy powder coated layer 40 used to initially coat the perimeter of the coil ends 5.

In this embodiment, the coil is first wound on the stator core 2 and this combination is vacuum - impregnated with the epoxy resin varnish 20. The stator core 2 and the coil are dried and the perimeter of the coil end 5 is coated with epoxy resin powder so that the powder coated layer 40 may be obtained. The perimeter of the coil end 5, and the outer periphery and the sides of the stator core 2 are then molded within an epoxy resin mold to obtain the illustrated form of the resin body 30.

Figure 3:
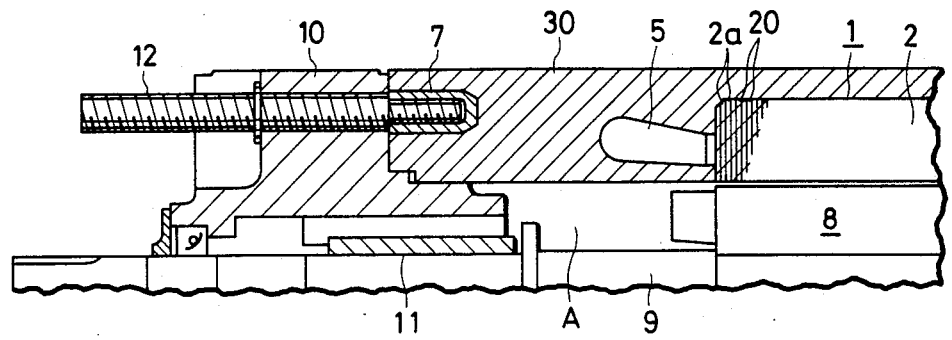
FIG. 3 is a sectional view of another molded type underwater motor embodying the present invention.

In another embodiment of the present invention, the perimeter of the coil end 5 is, as shown in FIG. 3, not provided with the powder coated layer 40 but is covered with the epoxy resin molded member 30 directly.

In the embodiment of FIG. 3, the coil is first wound on the stator core 2 and the combination is vacuum-impregnated with the epoxy resin varnish 50. The stator core 2 and the coil are then dried, and the perimeter of the coil end 5, and the outer periphery and the sides of the stator core 2 are molded within the epoxy resin mold to obtain the resin molded member 30.

Figure 4:
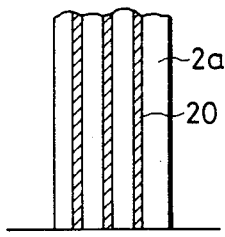
FIG. 4 is an enlarged view of the stator core.
Figure 5:
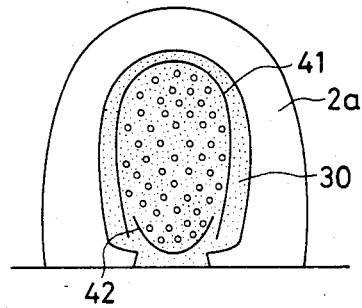
FIG. 5 is an elevational view of a core piece.

FIG. 4 is an enlarged view of the stator core 2 of FIG. 2. As is obvious from FIG. 4, epoxy resin varnish is sandwiched between the core pieces 2a in the form of laminations through vacuum impregnation. FIG. 5 is a sectional view of the stator core 2 taken on line V—V of FIG. 2, wherein it is seen that there is no gap inside a slot cell 41 and a wedge 42, whereas the outside of each is surrounded by the epoxy resin body 30 to a fixed thickness.

Accordingly, the coil end 5 is made doubly impenetrable to outside water by the resin 30 and the powder coated layer 40, whereas the coil within the stator core 2 is made water-impenetrable by the varnish 20 between and around the core pieces 2a, respectively. The opening of the slot is made water-impenetrable by the resin 30 of fixed thickness.

Moreover, since a resin of the same family is used in the preparation of the resin body 30, the powder coated layer 40 and the varnish 20, the adhesion between these materials becomes greater and waterproofing is thus considerably improved.

Figure 1:
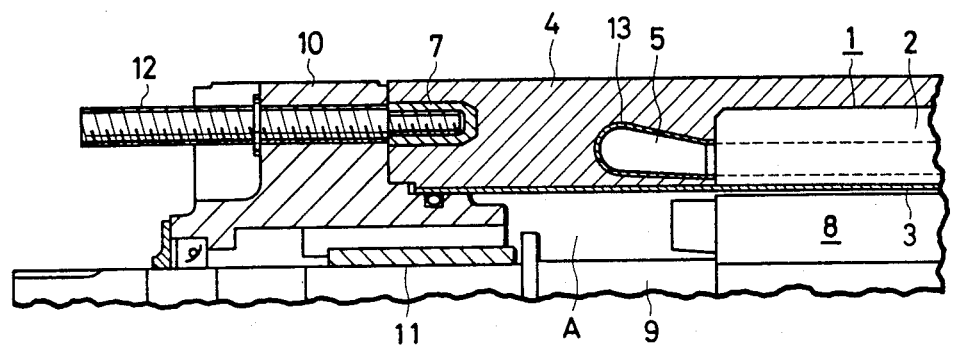
FIG. 1 is a sectional view of a first type of molded type underwater motor.
Figure 6:
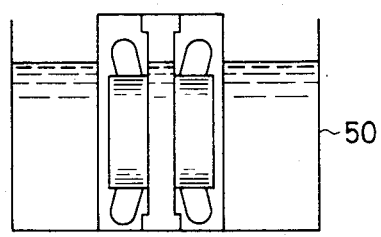
FIG. 6 is a diagram of laboratory equipment for studying the insulating effects of the motor according to the present invention.

FIG. 6 is a schematic illustration of laboratory equipment for studying the insulating characteristics of the underwater motor according to the present invention. Molded stators of the motor according to the present invention and the conventional ones which were not impregnated with varnish, as shown in FIG. 1, were put into a water tank 50 containing water at normal temperature and pressure to measure a value of electrical resistance between coil and water contained in the water tank 50 in the present and conventional stators.

Figure 7:
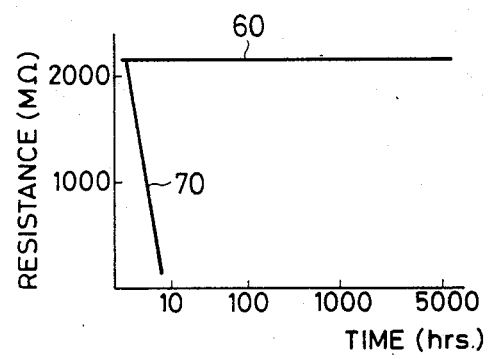
FIG. 7 is a graph illustrating the results obtained from experimental testing.

FIG. 7 is a graphical representation illustrating the results obtained from the above-described experiments, wherein the abscissa designates the time (hrs) of exposure to water and the ordinate the resistance (M$\Omega$). Line 60 shows the insulating characteristics of the molded motor according to the present invention, and line 70 shows that according to the conventional ones. As is obvious from the graph, the insulating characteristics of the motor according to the present invention, whose stator core has been impregnated with varnish, are seen to be far superior to those of the conventional stator without varnish impregnation.

As set forth above, since the molded type underwater motor according to the present invention is equipped with a stator core impregnated with varnish, and with a powder coating provided on the perimeters of the coil ends and the resin body covering both the powder coated coil ends and the stator core, infiltrating water can be completely checked. Consequently, the above-described arrangement makes it possible to discontinue the use of the conventional can and has the effect of obtaining an underwater motor of extremely simple construction which has excellent insulating characteristics.

What is claimed is:

1. A molded-type underwater motor, comprising: a stator core comprising a plurality of stator core pieces; first portions of a first type of varnish, sandwiched between consecutive ones of said stator core pieces; at least one length of coil wound around said stator core; a second portion of a second type of varnish covering said coil, wherein said stator core is impregnated with varnish, coil ends projecting from sides of stator core; and a molded resin body encapsulating said coil ends and covering the perimeter of said stator core.

2. A molded-type underwater motor as claimed in claim 1, further including a resin powder coating on perimeters of said coil ends, said powder coating being overlaid by said molded resin body.

3. A molded-type underwater motor as claimed in claim 1, wherein said coil is covered with said second portion of said second type of varnish by vaccum impregnation.

4. A molded-type underwater motor as claimed in claim 2, wherein said powder coating comprises an epoxy resin.

5. A molded-type underwater motor as claimed in claim 1, wherein said molded resin body comprises an epoxy resin.

6. A molded-type underwater motor as claimed in claim 1, wherein said first and second types of varnish are epoxy resin varnish.

* * * * *